United States Patent [19]

Vandemotter et al.

[11] Patent Number: 4,837,552

[45] Date of Patent: Jun. 6, 1989

[54] NON-VOLATILE FAULT DISPLAY WITH MAGNETIC RESET SWITCH FOR ADAPTIVE BRAKING SYSTEM

[75] Inventors: Patrick J. Vandemotter, Westlake; Merlyn L. Hutchins, Wellington; Jon S. Canale, Avon Lake; Kenneth R. Koyan, Wellington, all of Ohio

[73] Assignee: Allied-Signal Inc., Morristown, N.J.

[21] Appl. No.: 172,930

[22] Filed: Mar. 25, 1988

[51] Int. Cl.$^4$ .............................................. B60Q 1/00
[52] U.S. Cl. .................................... 340/461; 340/525; 340/568; 340/815.15
[58] Field of Search .................. 340/52 F, 52 R, 525, 340/568, 571, 697, 664, 659, 643, 815.15, 815.03

[56] References Cited

U.S. PATENT DOCUMENTS

| | | | |
|---|---|---|---|
| 4,011,555 | 3/1977 | Pearce | 340/568 |
| 4,271,402 | 6/1981 | Kastura et al. | 340/52 F |
| 4,536,758 | 8/1985 | Schweitzer, Jr. | 340/664 |
| 4,635,034 | 1/1987 | Tokuyama et al. | 340/52 F |

*Primary Examiner*—Donnie L. Crosland

*Attorney, Agent, or Firm*—Ken C. Decker; William N. Antonis

[57] ABSTRACT

A fault indicating mechanism for an electronic system, such as a vehicle adaptive braking system, includes a series of visual indicators, such as light emitting diodes, on one surface of the housing within which the electronic components comprising the system are sealed. Each of the indicators is activated in response to a predetermined malfunction sensed in the system, such as a defective speed sensor, defective modulator, or a defect in the electronic circuitry. A magnetically responsive switch is sealed within the housing adjacent the indicators, but is not visible from the exterior of the housing. The indicators are reset when the system is repaired by the mechanic who holds a common magnet against the housing adjacent the switch. When the switch is activated by a magnet, all of the indicators flash on and are then turned off. A non-volatile RAM stores malfunctions sensed by the system when the system is powered down, so that all malfunctions are again indicated immediately when the system is powered up.

7 Claims, 3 Drawing Sheets

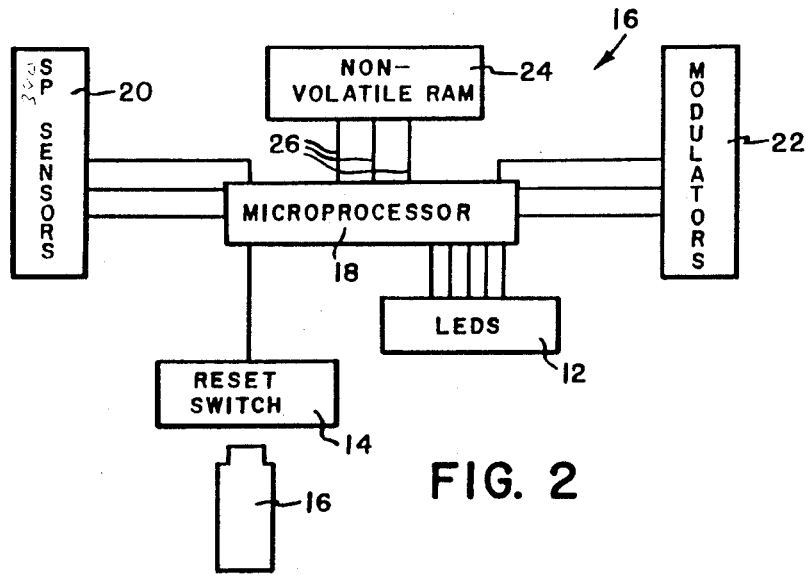
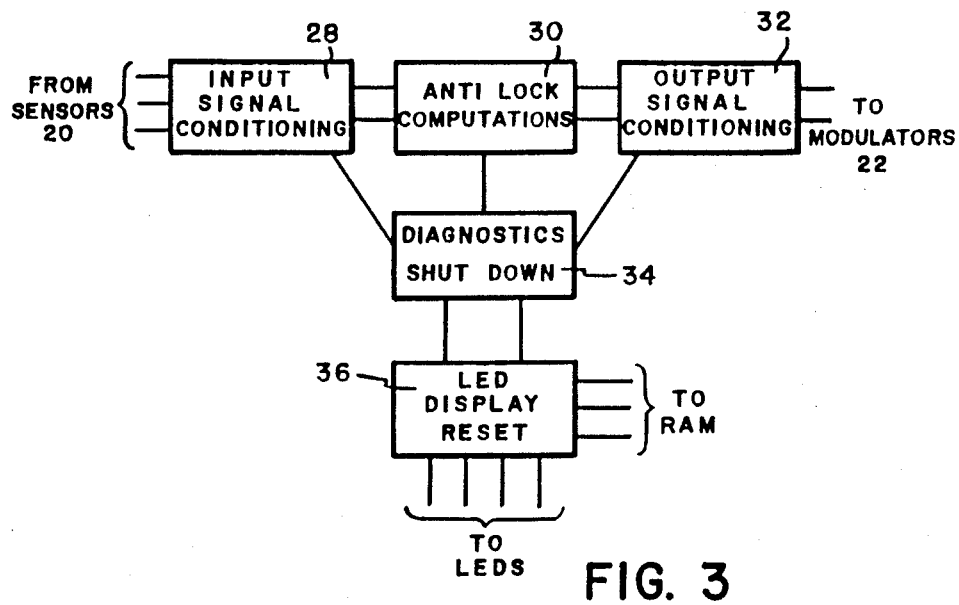

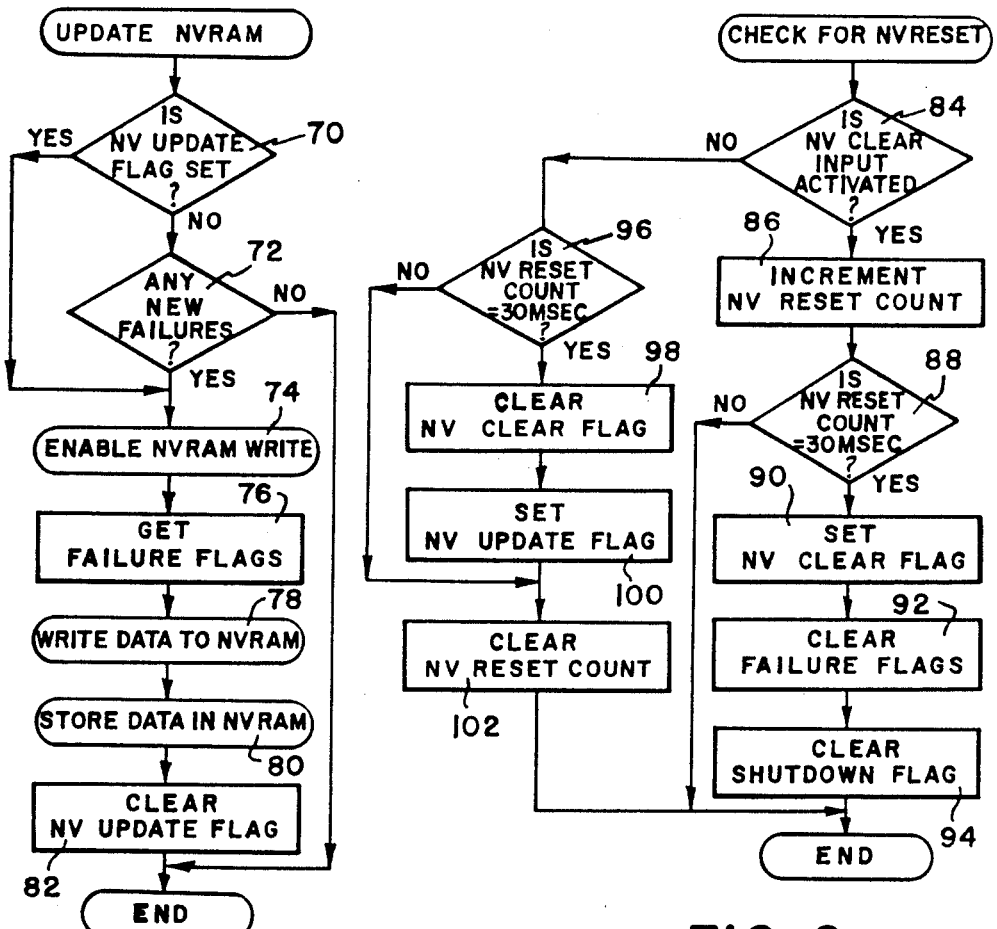
FIG. 5
FIG. 6
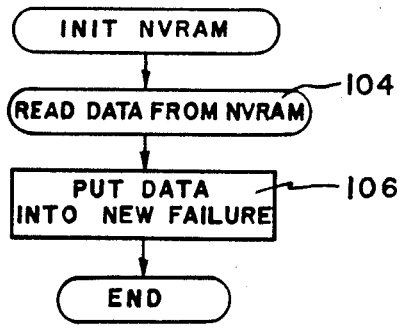
FIG. 7

NON-VOLATILE FAULT DISPLAY WITH MAGNETIC RESET SWITCH FOR ADAPTIVE BRAKING SYSTEM

This invention relates to a fault display and reset mechanism for a vehicle electronic control system, such as an adaptive braking system.

Vehicle electronic control systems, such as adaptive braking systems, normally work quite well and are very reliable. However, because of the environmental and physical stresses to which components of these systems are subjected due to their being mounted in the adverse environment on the exterior of the vehicle, such systems occasionally malfunction. Many of these malfunctions are rather simple to correct. For example, a common malfunction is a shorted or open sensor or modulator, which may be caused by a broken wire, a connector being vibrated loose, etc. Such malfunctions are relatively simple for even a relatively untrained mechanic to correct, but until now the only warning of such a malfunction was a warning light in the vehicle operator's compartment. Furthermore, some malfunctions are intermittent. Since the warning device is activated only during such a malfunction, upon vehicle shutdown and subsequent powerup the warning device is not activated until the malfunction occurs again. Accordingly, there is no record of such a malfunction, so that even if the vehicle was serviced in the interim the defect probably would not have been either noted or corrected.

According to the present invention, a series of light emitting diodes (LEDs) are provided on the housing within which the electronic control unit component of the system is mounted. Each of the light emitting diodes is activated in response to a predetermined discrete fault in the system. For example, one of the light emitting diodes may be activated in response to a fault in one of the wheel speed sensors, and another of the light emitting diodes may be activated in response to a malfunction in one of the modulators. Accordingly, a relatively unskilled mechanic is able to examine the wires, connectors, etc. associated with the corresponding wheel speed sensor or modulator. If a broken wire is found or a loose connector is didcovered, the mechanic can quickly repair the system, perhaps in the field, thereby saving valuable time that would ordinarily be required to send the vehicle to a maintenance location to perform more sophisticated diagnostic tasks. Of course, if the mechanic is unsuccessful in locating such a simple failure, or if the light emitting diode corresponding to a fault in, for example, the system logic controller is activated, the driver knows immediately that the vehicle must be taken to a maintenance location where a mechanic skilled in repairing electronic systems is available.

According to another feature of the invention, the faults sensed by the system and indicated on the light emitting diodes are stored in a non-volatile memory when the system is powered down when the vehicle is parked. Accordingly, once a malfunction occurs, the malfunction is stored in memory, and the corresponding indicator is activated upon system powerup at a later time. Accordingly, if a transient or intermittent failure does occur, the mechanic repairing the system will immediately know that such a fault has occured at some time during the operation of the vehicle.

Of course, since the faults are stored in the non-volatile memory, it is, of course, necessary that the mechanic be able to clear the faults when the system has been repaired. Normally this would be done by providing a reset switch on the housing or elsewhere on the vehicle. However, such reset switches in themselves are a cause of malfunctions. Since the system is mounted on the exterior of the vehicle, the mechanical-type reset switch must penetrate the housing, thereby resulting in a less than satisfactory environmental seal. According to the present invention, a magnetic reset switch is provided within the housing, which is sealed against environmental contaminants, but is located adjacent to the wall of the housing. A trained mechanic knows the approximate location of the magnetic reset switch, and can clear the faults merely by passing a common magnet over the area of the housing within which the magnetic reset switch is located. By housing the switch within the housing, the contacts of the device are protected from, or immune to, oxidation and corrosion of the electrical contacts resulting from exposure of the device to the atmosphere. Furthermore, the magnetic reset switch provides tamper resistance due to the fact that no exterior switch button is visible to the user. A trained mechanic can easily activate the switch because he has been trained as to its location and the manner in which a magnet must be placed near the portion of the housing within which the switch is mounted in order to reset the switch. However, the vehicle driver, or another untrained person, cannot easily tell how to reset the indicators.

These and other features of the invention will become apparent from the following description, with reference to the accompanying drawings, in which:

FIG. 1 is a side view of a housing for a vehicle electronic control system, illustrating the location of the indicators and reset switch according to the present invention;

FIG. 2 is a diagrammatic illustration of the various components of an adaptive braking system including a failure indicating mechanism according to the present invention;

FIG. 3 is a diagrammatic view of the various functions performed by the microprocessor used in the present invention; and FIGS. 4–7 are diagrammatic flow charts illustraring the sequence of operation of the system for indicating faults according to the present invention.

Figure 4:
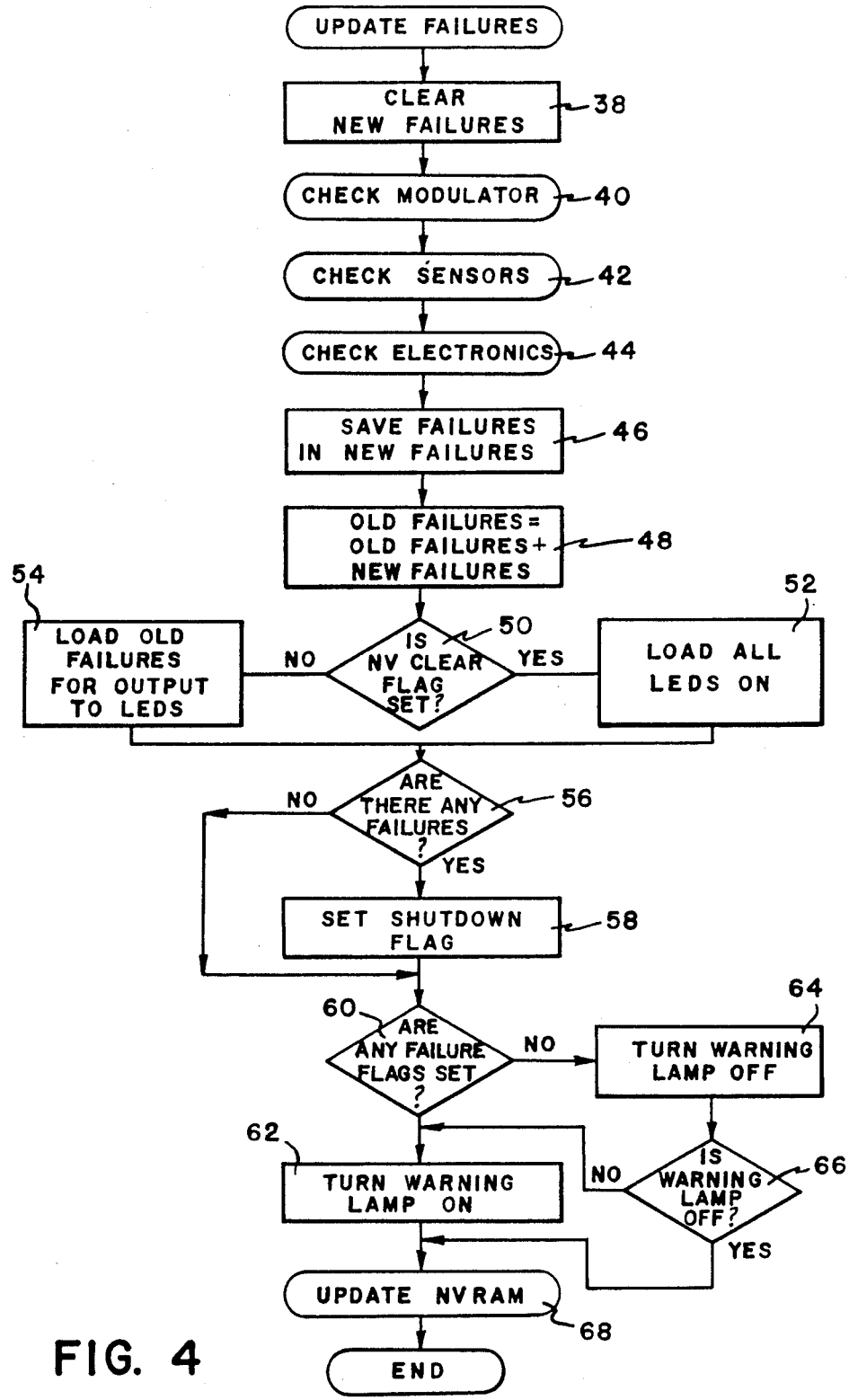

Reffering now to FIG. 1 of the drawings, the electronic control unit which comprises a part of a larger electronic system is housed within a housing generally indicated by the numeral 10. Housing 10 is provided with sealed apertures exposing a series of light emitting diodes 12. A magnet reset switch which, as will be described hereinafter, is used to reset the faults indicated by the light emitting diodes 12, is illustrated in phantom as at 14. The magnetic reset switch 14 is sealed within the housing 10, but is mounted adjacent to the wall thereof, where it can respond to a magnet passed along the exterior of the housing 10. The housing 10 further includes ports (not shown) for connection to vehicle speed sensors and adaptive braking pressure modulators (not shown in FIG. 1).

Referring to FIG. 2, the adaptive braking system is illustrated diagrammatically as at 16. The system 16 includes a microprocessor 18 which is mounted within the housing 10. The microprocessor 18 is connected to one or more speed sensors 20 through the ports (not shown) on the housing 10. The speed sensors 20 may either be a conventional drive line speed sensor mounted in the vehicle transmission or differential, or may be wheel speed sensors mounted at the vehicle wheels. Such sensors are conventional, and provide a pulsed output which is transmitted to the microprocessor 18, the frequency of the pulses being proportional to wheel or drive line speed. The microprocessor 18 processes the signals received from the speed sensors 20 and generates output signals which control one or more brake pressure modulators 22. Brake pressure modulators 22 are also conventional, and are adapted to decrease and thereafter increase braking pressure in response to incipient skidding conditions detected by the micropressor 18 in response to the signals generated by the speed sensors 20. Microprocessor 18 also includes diagnostics which check the microprocessor 18, the modulators 22, and the speed sensors 20 for faults. In response to such faults, the microprocessor 18 activates one or more of the light emitting diodes 12, which are provided to indicate faults in the speed sensors, the modulators, or the microprocessor. A feature of the invention is that one or more discrete light emitting diodes id provided for each of the possible faults detected, so that the mechanic servicing the vehicle can immediately tell, by examining the status of the light emitting diodes 12, which of the components of the system is malfuncting. Since many of the malfunctions sensed by the aforementioned diagnostics are of a transient or temporary nature, and which are eliminated when the system powers down upon vehicle shutoff, a non-volatile random access memory 24 is provided to store the faults detected by the aforementioned diagnostics, so that upon powerup when the vehicle is started the same light emitting diodes 12 are again activated as were activated before shut down. The magnetic reset switch 14 is connected through the microprocessor and resets the light emitting diodes 12 when the vehicle has been serviced and the faults no longer exist. The mechanic resets the switch 14, as will hereinafter be described, by passing a magnet 16 across that portion of the housing 10 within which the magnetic reset switch 14 is mounted. The non-volatile memory 24 is connected to the microprocessor 18 through the necessary data transmission lines and control lines generally indicated at 26.

Referring now to FIG. 3, the microprocessor generally indicated by the numeral 18 includes an input signal conditioning routine generally indicated by the numeral 28 which conditions and checks the signals received from the speed sensors 20. The input signal conditioning routine 28 transmits signals representing speed to the antilock computation section of the microprocessor generally indicated by the numeral 30. The antilock computation section 30 generates output signals for transmission to the modulators 22 through an output conditioning routine 32 according to well established principles of wheel lock control used in adaptive braking systems. A diagnostic and shutdown routine generally indicated by 34 monitors the input signal conditioning 28, the antiskid computation section 30, and the output signal conditioning routine 32 to check for malfunctions in any of the circuitry or routines within the microprocessor 18 and is also capable, by examining the signals transmitted to the input conditioning routine 28 or transmitted to the modulator 22, to establish faults in the sensors 20 or the modulators 22. Upon sensing such a fault, the diagnostic routine 34 shuts down the system, activates a warning device (not shown) on the vehicle operator's compartment, and also activates one or more of the light emitting diodes 12, through a LED display and reset routine generally indicated by the numeral 36. This routine controls the activity and resetting of the light emitting diodes 12, and also controls communication of the various faults to the non-volatile memory 24.

Referring now to FIG. 4, the LED display and reset routine 36 cycles through the program illustrated in FIG. 4 every 10 to 30 milliseconds (depending upon the speed of the vehicle) in order to check for faults and to display such faults through the light emitting diodes 12. The microprocessor 18 includes an internal memory, in the routine illustrated diagrammatically in FIG. 4, this internal memory includes two sectins called "old failures" and "new failures". The "old failures" section stores failures detected on the previous cycle through the routine, and the "new failures" section stores failures detected on the present cycle.

The update failure routine illustrated in FIG. 4 is executed every 10 to 30 milliseconds (depending upon the output of the speed sensor) during operation of the vehicle. Referring to FIG. 4, the new failures (that is, the failure flags set on the most recent pass through the routine) are cleared from memory as indicated at 38. The diagnostic section 34 of the microprocessor is checked for modulator failures as indicated at 40, speed sensor failures as indicated at 42, and electronic failures as indicated at 44. If any such failures are detected, they are stored in memory as new failures as indicated at 46. As indicated at 48, the old failures section of the memory is set equal to all of the old failures already stored in memory plus the new failures as from 46. The NV CLEAR flag (see FIG. 6) is then tested as indicated at 50. If the NV CLEAR flag has been set, all of the LEDS are loaded on as indicated at 52. As will be described hereinafter with reference to FIG. 6, the NV ClEAR flag is set while the aforementioned magnet is held against the magnetic reset switch 14. All of the LEDs, regardless of the failures, are then turned on to indicate to the mechanic that the failures have been cleared.

If the NV CLEAR flag has not been set, the old failures are loaded for the output to the LEDs as indicated at 54. Accordingly, the LEDs are turned on which correspond to the various failures set in old failures. Memory is then tested, as indicated at 56 to determine if there are any failures stored in memory, if there are failures, the shut down flag is set as at 58. This flag is used by the microprocessor to turn off the adaptive braking because of the failure. If there are no failures, the routine branches around 58. The program again tests to determine if there are failures as indicated at 60. If there are failures, the warning lamp in the vehicle operator's compartment is turned on as indicated at 62, to warn the driver that the adaptive braking system has been disabled. If there are no failure flags set, the warning lamp is turned off as indicated at 64. The warning lamp is then tested as at 66 to determine if it has been turned off or not. If the warning lamp is still on, after it should have been turned off at 64, the routine branches to block 62 so that the warning light is turned back on, in view of the warning lamp failure. If the warning lamp is off, the routine calls the update NVRAM subroutine illustrated in FIG. 5, as indicated at 68, before the routine ends.

Referring now to FIG. 5, the update NVRAM subroutine first tests the NV UPDATE flag as indicated at 70. If the NV UPDATE flag has not been set, the routine then tests to determine if there are any new failure flags set, as indicated at 72. If the NV UPDATE flag has been set (see FIg. 6), the routine branches around decision block 72. The NV UPDATE flag indicates that all the faults were cleared by actuating the switch 14 on the last pass through the routine illustrated in FIG. 4. The routine illustrated in FIG. 5 then enables the system to write the data to the non-volatile RAM 24, as indicated at 74. The failure flags are then called from memory as indicated at 76, and the data is written to the non-volatile RAM as indicated at 78. A command is then transmitted over one of the control lines to the non-volatile RAM 24 to make the data written to the non-volatile RAM non-volatile, as indicated at 80. Accordingly, the data will be retained in memory even if the system is poweren down. The NV UPDATE flag is then cleared as indicated at 82. Referring back to decision block 72, if there are no new failures, the routine branches to the end.

When a mechanic resets the failure indicating light emitting diodes (LEDs) 12, the routine illustrated in FIG. 6 resets the light emitting diodes (LEDs) 12. A check is made to see if the NV CLEAR input is activated, as indicated at 84. The NV CLEAR input is the input generated by the magnetic reset switch 14 when the reset switch 14 is activated by a magnet held by the mechanic against the housing adjacent to the reset switch 14, as discussed hereinabove. If the NV CLEAR input has been activared, the NV reset count is then incremented by 10 milliseconds as indicated at 86. The NV reset count is a counter which is incremented every time a pass is made through the routine as illustrated in FIG. 6 while the magnet is being held against the housing. The reset count is then tested, as indicated at 88, to see if it is equal to 30 milliseconds. In other words, incrementing the counter 86 in the decision block 88 requires that the magnet be held against the housing adjacent to the reset switch for at least 30 milliseconds. This prevents the failure indicators from being inadvertently cleared by stray magnetic singles. If the magnet was not held against the housing to activate the switch 14 for at least 30 milliseconds, the program branches to the end. However, if the magnet has been held adjacent the switch 14 for at least 30 milliseconds, the NV CLEAR flag is set as indicated at 90. As discussed hereinabove with respect to FIG. 4, the NV CLEAR flag causes all of the indicators 12 to be turned on when the faults are cleared, thus indicating to the mechanic that the faults have indeed been cleared. All failure flags are then cleared as indicated at 92, and the shut down flag discussed with respect to FIG. 4 is also cleared as indicated at 94 before the routine ends.

The routine illustrated if FIg. 6 is cycled approximately every 10 milliseconds while the electronic system is being operated. Normally, the magnetic reset switch will not be activated and the routine branches from decision block 84 to decision block 96. During normal operation of the system, the reset count will have been reset equal to 0, which is effected as indicated as indicated at 88. However, the first time through the routine after the aforementioned magnet has been removed from adjacent the magnetic reset switch 14, the reset count will not have been reset. Accordingly, the NV CLEAR flag is cleared as indicated at 98, and the NV UPDATE flag is set as indicated at 100.As discussed hereinabove, the NV UPDATE flag is tested in the routine illustrated in FIG. 5. The NV reset count is then cleared as indicated at 102. Accordingly, the routine illustrated in FIG. 6 clears all failures and turns on all of the indicators 12 when the magnet has been held adjacent to the switch 14 for a minimum of 30 milliseconds, and then turns off all of the indicators when the magnet is removed from adjacent the switch 14 after being held against the housing adjacent to switch 14 for a minimum of 30 milliseconds.

The rather short routine illustrated in FIG. 7 is performed only once upon vehicle system powerup. The data stored in the non-volatile RAM is read as indicated at 104 and is put into the new failure flags section of the memory in the microprocessor as indicated in 106, before the subroutine ends.

We claim:

1. Fault indicating mechanism for an electronic system, said electronic system including a housing and electronic components within said housing, said housing protecting said components from environmental contaminants, an electronic display including a series of discrete indicators, each of said indicators being mounted within said housing but visible from the extwerior thereof for indicating malfunctions of one or more components of said electronic system, each of said indicators indicating a corresponding predetermined type of malfunction, and a reset mechanism sealed within said housing and inaccessible from outside of said housing without disassembly of the housing for resetting said electronic display, said reset mechanism including a magnetically responsive component covered by the housing which responds to a magnet held adjacent that portion of the housing covering the magnetically responsive component to reset said display after the malfunctions indicated thereby are corrected, memory means for storing records of said malfunctions even if power to the system is turned off and for causing said electronic display to again display the malfunctions displayed before the power was turned off when the power is again turned on, and diagnostic means for sensing malfunctions of said components, said memory means including means for memorizing each malfunction sensed by said diagnostic means and causing said electronic display to indicate said malfunction even if the malfunction disappears.

2. Fault indicating mechanism as claimed in claim 1. wherein said discrete indicaters are light emitting diodes.

3. Fault indicating mechanism as claimed in claim 1, wherein said system is a vehicle adaptive braking system including vehicle speed sensing means, brake pressure modulator means, and control means responsive to said speed sensing means for operating said modulator means, said discrete indicators including at least one indicator for indicating a malfunction in one of said speed sensing means and at least one indicator for indicating a malfunction of said modulator means.

4. Fault indicating mechanism as claimed in claim 1, wherein said reset mechanism includes means for actuating all said discrete indicators when said magnetically activated means responds to said magnet held adjacent the housing, and then extinguishes said indicators when the magnet is then moved away from said housing.

5. Fault indicating mechanism for an electronic system, said electronic system including a housing and electronic components within said housing, said housing protecting said components from environmental contaminants, an electronic display including a series of discrete indicators, each of said indicators mounted within said housing but visible from the exterior thereof for indicating malfunctions of one or more components of said electronic system, each of said indicators indicating a corresponding predetermined type of malfunction, and a reset mechanism sealed within said housing and inaccessible from outside of said housing without disassembly of the housing for resetting said electronic display, said reset mechanism including a magnetically responsive component covered by the housing which responds to a magnet held adjacent that portion of the housing covering the magnetically responsive component to reset said display after the malfunctions indicated thereby are corrected, said reset mechanism including means for actuating all of said discrete indicators when said magnetically activated means responds to said magnet held adjacent the housing, and then extinguishes said indicators when the magnet is then moved away from said housing.

6. Fault indicating mechanism as claimed in claim 5, wherein said system is a vehicle adaptive braking system including vehicle speed sensing means, brake pressure modulator means, and control means responsive to said speed sensing means for operating said modulator means, said electronic display including at least one indicator for indicating a malfunction in one of said speed sensing means and at least one indicator for indicating a malfunction of said modulator means.

7. Fault indicating mechanism as claimed in claim 5, wherein said system includes diagnostic means for sensing malfunctions of said components and memory means for storing records of said malfunctions, said memory means including means for memorizing each malfunction sensed by said diagnostic means and causing said electronic display to indicate said malfunction even if the malfunction disappears.

* * * * *